US012670688B2

(12) United States Patent
Gupta et al.

(10) Patent No.: US 12,670,688 B2
(45) Date of Patent: Jun. 30, 2026

(54) METHODS, SYSTEMS, AND MEDIA FOR NAVIGATING VIDEO CONTENT

(71) Applicants:Anurag Gupta, Herndon, VA (US);
Premith Kumar Chilukuri,
Blacksburg, VA (US); Aarav Gupta,
Herndon, VA (US); Ansh Gupta,
Herndon, VA (US)

(72) Inventors: Anurag Gupta, Herndon, VA (US);
Premith Kumar Chilukuri,
Blacksburg, VA (US); Aarav Gupta,
Herndon, VA (US); Ansh Gupta,
Herndon, VA (US)

( * ) Notice: Subject to any disclaimer, the term of this
patent is extended or adjusted under 35
U.S.C. 154(b) by 299 days.

(21) Appl. No.: 18/585,486

(22) Filed: Feb. 23, 2024

(65) Prior Publication Data

US 2025/0272948 A1     Aug. 28, 2025

(51) Int. Cl.
*G06V 10/44* (2022.01)
*G06V 20/70* (2022.01)
*G06V 40/16* (2022.01)

(52) U.S. Cl.
CPC .............. *G06V 10/44* (2022.01); *G06V 20/70*
(2022.01); *G06V 40/168* (2022.01); *G06V*
*2201/07* (2022.01)

(58) Field of Classification Search
CPC ...... G06V 10/44; G06V 20/70; G06V 40/168;
G06V 2201/07
See application file for complete search history.

(56) References Cited

U.S. PATENT DOCUMENTS

| | | | | |
|---|---|---|---|---|
| 11,978,271 | B1 * | 5/2024 | Kharbanda | ............ G06V 20/20 |
| 12,511,870 | B2 * | 12/2025 | Mejia | .................... G06V 10/761 |
| 2025/0078361 | A1 * | 3/2025 | Narayana | ................ G06T 11/60 |
| 2025/0139161 | A1 * | 5/2025 | Aneja | .................... G10L 15/183 |
| 2025/0157234 | A1 * | 5/2025 | Jin | .................... H04N 21/44008 |
| 2025/0190503 | A1 * | 6/2025 | Lee | ..................... G06F 16/9535 |

* cited by examiner

*Primary Examiner* — Han Hoang
(74) *Attorney, Agent, or Firm* — The Rapacke Group,
P.A.

(57) ABSTRACT

Systems, methods, and media for navigating video content
are disclosed. Systems, methods, and media can receive at
least a first video content item; select a first subset of video
frames; identify, using a first computer vision model, a
plurality of sets of visual features; generate, using a first
language model, a plurality of sets of caption data for the
first subset of video frames; generate, using a first speech
recognition model, recognized speech data based at least on
the audio data of the first video content item; receive first
user query data; generate, using a second language model, at
least a first textual response to the first user query data;
determine, using a third language model, first relevant video
frames of the first subset of video frames which are asso-
ciated with respective time positions; and cause one or more
selectable links to the respective time positions to be pre-
sented.

20 Claims, 11 Drawing Sheets

300

310

RECEIVE AT LEAST A FIRST VIDEO MEDIA ITEM

320

SELECT A FIRST SUBSET OF VIDEO FRAMES

330

IDENTIFY, USING A FIRST COMPUTER VISION MODEL, A PLURALITY OF SETS OF VISUAL FEATURES IN RESPECTIVE VIDEO FRAMES

340

GENERATE, USING A FIRST LANGUAGE MODEL, A PLURALITY OF SETS OF CAPTION DATA FOR THE VIDEO FRAMES

350

GENERATE, USING A FIRST SPEECH RECOGNITION MODEL, RECOGNIZED SPEECH DATA

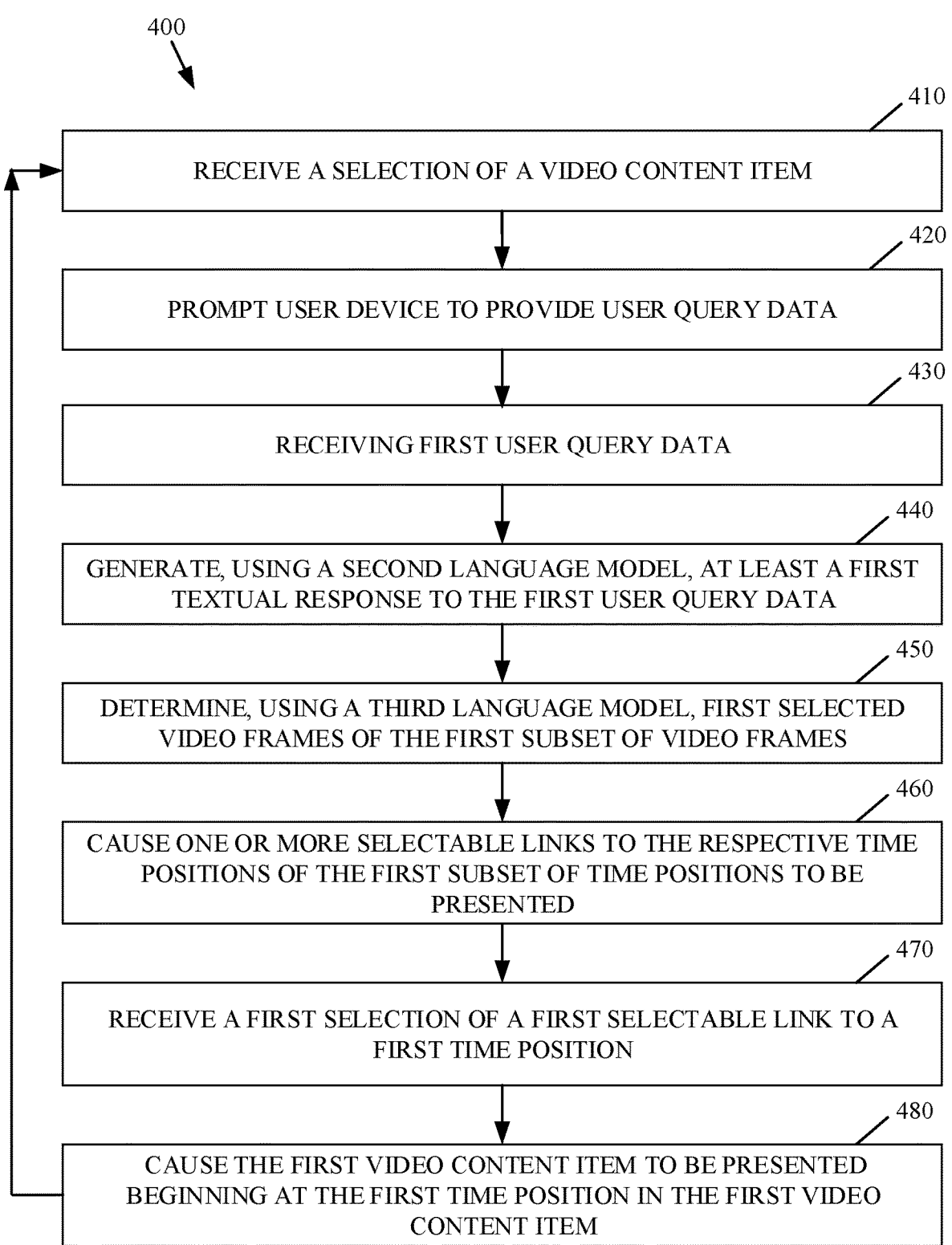

400

410

RECEIVE A SELECTION OF A VIDEO CONTENT ITEM

420

PROMPT USER DEVICE TO PROVIDE USER QUERY DATA

430

RECEIVING FIRST USER QUERY DATA

440

GENERATE, USING A SECOND LANGUAGE MODEL, AT LEAST A FIRST TEXTUAL RESPONSE TO THE FIRST USER QUERY DATA

450

DETERMINE, USING A THIRD LANGUAGE MODEL, FIRST SELECTED VIDEO FRAMES OF THE FIRST SUBSET OF VIDEO FRAMES

460

CAUSE ONE OR MORE SELECTABLE LINKS TO THE RESPECTIVE TIME POSITIONS OF THE FIRST SUBSET OF TIME POSITIONS TO BE PRESENTED

470

RECEIVE A FIRST SELECTION OF A FIRST SELECTABLE LINK TO A FIRST TIME POSITION

480

CAUSE THE FIRST VIDEO CONTENT ITEM TO BE PRESENTED BEGINNING AT THE FIRST TIME POSITION IN THE FIRST VIDEO CONTENT ITEM

FIG. 4

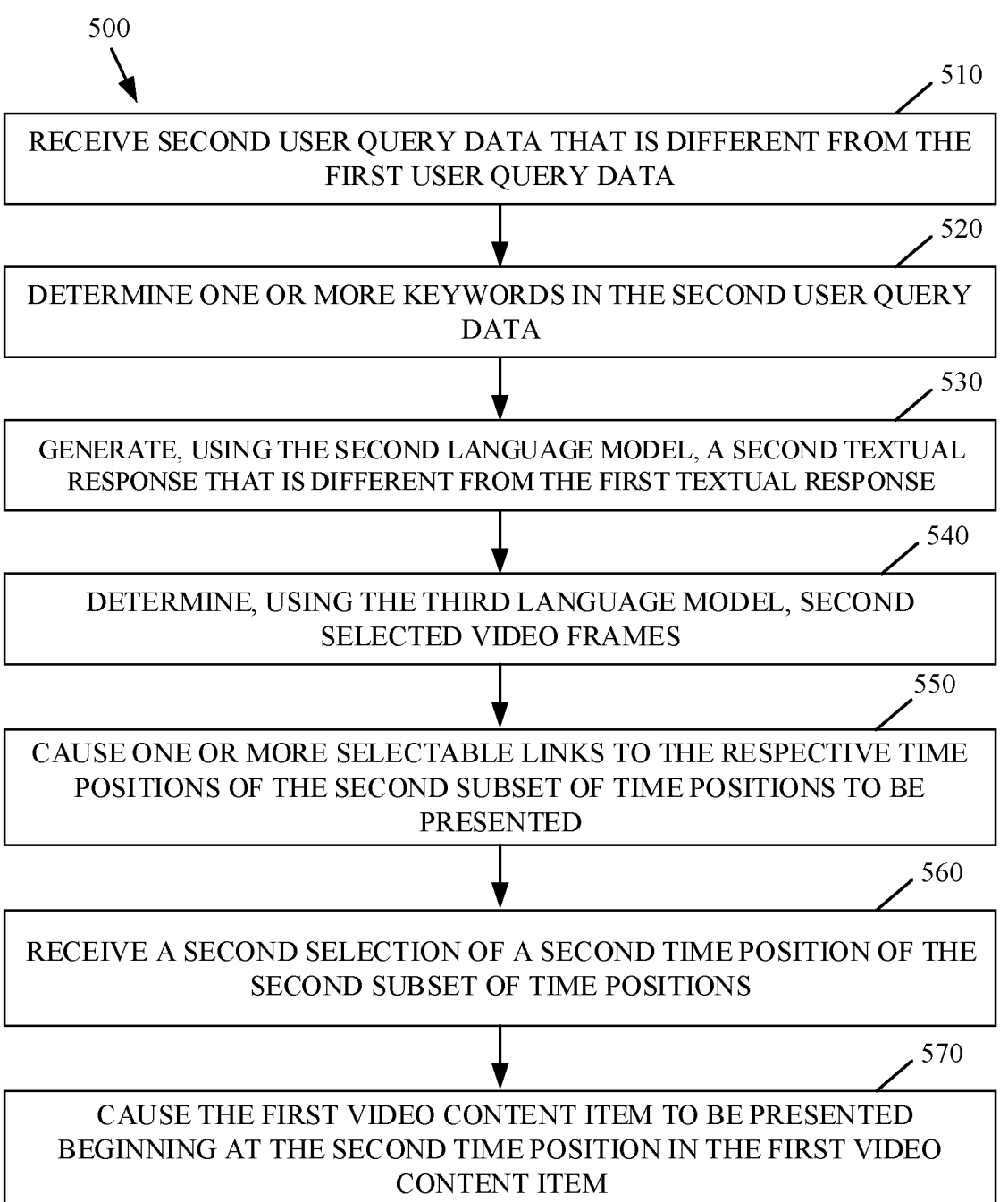

500

510
RECEIVE SECOND USER QUERY DATA THAT IS DIFFERENT FROM THE FIRST USER QUERY DATA

520
DETERMINE ONE OR MORE KEYWORDS IN THE SECOND USER QUERY DATA

530
GENERATE, USING THE SECOND LANGUAGE MODEL, A SECOND TEXTUAL RESPONSE THAT IS DIFFERENT FROM THE FIRST TEXTUAL RESPONSE

540
DETERMINE, USING THE THIRD LANGUAGE MODEL, SECOND SELECTED VIDEO FRAMES

550
CAUSE ONE OR MORE SELECTABLE LINKS TO THE RESPECTIVE TIME POSITIONS OF THE SECOND SUBSET OF TIME POSITIONS TO BE PRESENTED

560
RECEIVE A SECOND SELECTION OF A SECOND TIME POSITION OF THE SECOND SUBSET OF TIME POSITIONS

570
CAUSE THE FIRST VIDEO CONTENT ITEM TO BE PRESENTED BEGINNING AT THE SECOND TIME POSITION IN THE FIRST VIDEO CONTENT ITEM

FIG. 5

METHODS, SYSTEMS, AND MEDIA FOR NAVIGATING VIDEO CONTENT

TECHNICAL FIELD

Embodiments disclosed herein can relate to methods, systems, and media for navigating video content.

BACKGROUND

Online video content items can contain an extensive amount of audio and visual content, making it challenging for viewers to navigate through them. Moreover, users can have difficulty navigating even through a single online video content item. For example, a user may desire to find a particular object, a particular action, a particular actor or character, or a combination thereof, depicted in a video content item.

There is a need for mechanisms (which can include systems, methods, and/or media) that can receive a query, and that can at least determine which video frames of a video content item depict a particular object, a particular action, a particular actor or character, or a combination thereof, in response to receiving the query.

SUMMARY

This summary is provided to introduce a variety of concepts and/or aspects in a simplified form that is further disclosed in the detailed description, below. This summary is not intended to identify key or essential inventive concepts of the claimed subject matter, nor is it intended for determining the scope of the claimed subject matter.

A system of one or more computing devices can be configured to perform particular processes by virtue of having software, firmware, hardware, or a combination thereof installed on the system that in operation causes or cause the system to perform the processes.

In some embodiments, a method for navigating video content can include receiving at least a first video content item that includes visual data and audio data, the visual data including a first plurality of video frames associated with a first plurality of time positions in the first video content item; selecting a first subset of video frames of the first plurality of video frames; identifying, using a first computer vision model, a plurality of sets of visual features in respective video frames of the first subset of video frames; generating, using a first language model, a plurality of sets of caption data based at least on the plurality of sets of visual features in respective video frames of the first subset of video frames; generating, using a first speech recognition model, recognized speech data based at least on the audio data of the first video content item; receiving first user query data; generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames; generating, using a first language model, a plurality of sets of caption data based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

In some embodiments, the method can include any processes or subprocess disclosed herein.

In some embodiments, a system for navigating video content can include memory; and one or more processors coupled to the memory and configured at least to: receive at least a first video content item that includes visual data and audio data, the visual data including a first plurality of video frames associated with a first plurality of time positions in the first video content item; select a first subset of video frames of the first plurality of video frames; identify, using a first computer vision model, a plurality of sets of visual features in respective video frames of the first subset of video frames; generate, using a first language model, a plurality of sets of caption data based at least on the plurality of sets of visual features in respective video frames of the first subset of video frames; generate, using a first speech recognition model, recognized speech data based at least on the audio data of the first video content item; receive first user query data; generate, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determine, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and cause one or more selectable links to the respective time positions of the first subset of time positions to be presented.

In some embodiments, the one or more processors can be configured to perform any processes or subprocesses disclosed herein.

In some embodiments, a non-transitory computer-readable medium can include instructions, that when executed by one or more processors, cause the one or more processors to perform a method for navigating video content, the method comprising: receiving at least a first video content item that includes visual data and audio data, the visual data including a first plurality of video frames associated with a first plurality of time positions in the first video content item; selecting a first subset of video frames of the first plurality of video frames; identifying, using a first computer vision model, a plurality of sets of visual features in respective video frames of the first subset of video frames; generating, using a first language model, a plurality of sets of caption data based at least on the plurality of sets of visual features in respective video frames of the first subset of video frames; generating, using a first speech recognition model, recognized speech data based at least on the audio data of the first video content item; receiving first user query data; generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

In some embodiments, the method performed by the one or more processors can include any processes or subprocesses disclosed herein.

In some embodiments, any processes or subprocesses disclosed herein can be performed in any suitable order.

BRIEF DESCRIPTION OF THE DRAWINGS

A complete understanding of the present features or aspects and the advantages and features thereof will be more readily understood by reference to the following detailed description when considered in conjunction with the accompanying drawings wherein:

FIG. 4 illustrates a flow diagram of a process for navigating video content, according to some embodiments disclosed herein;

FIG. 5 illustrates a flow diagram of a process for navigating video content, according to some embodiments disclosed herein;

4

Figure 11:
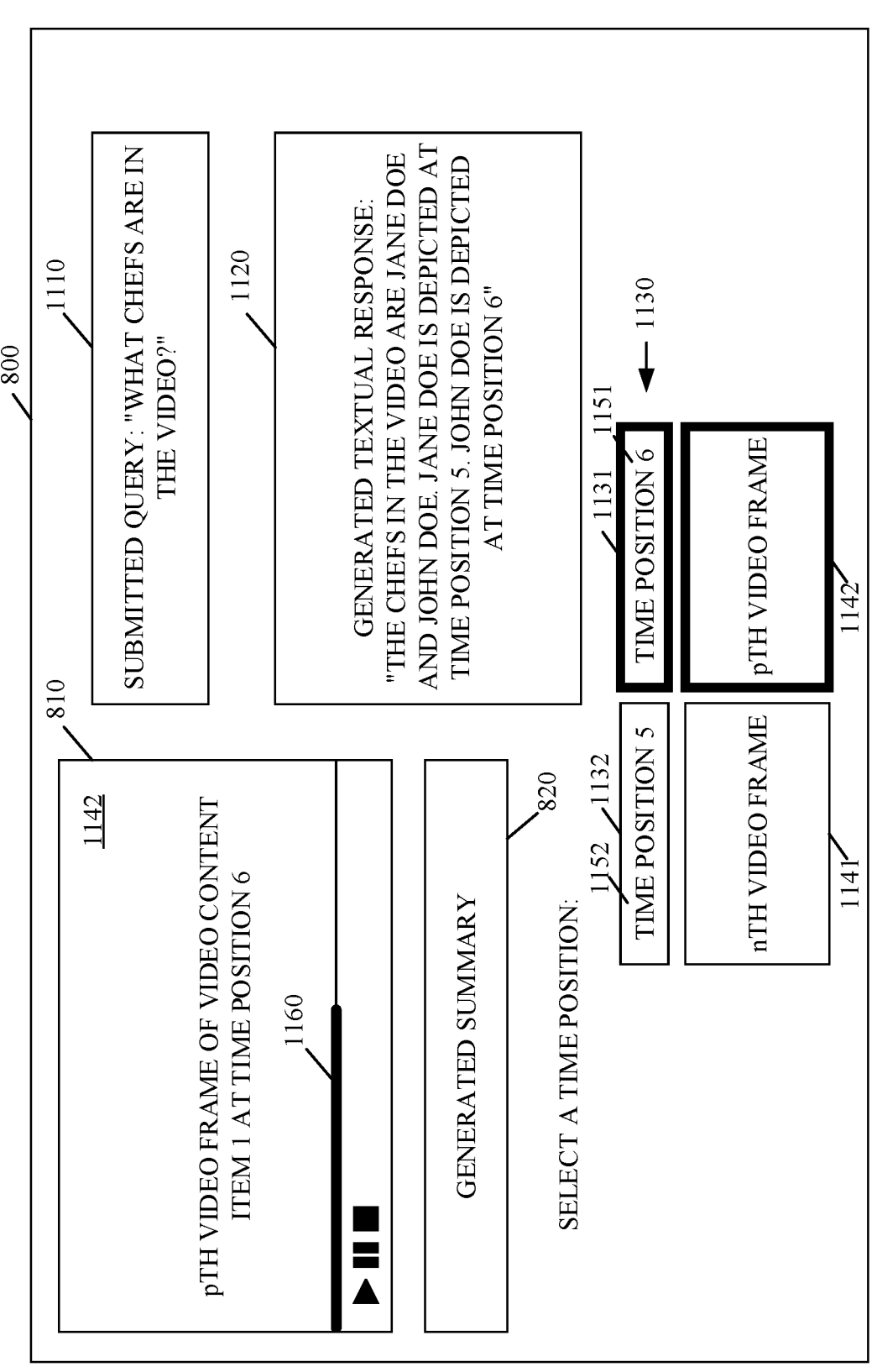

FIG. 11 illustrates a user interface for navigating video content, according to some embodiments disclosed herein.

The drawings are not necessarily to scale, and certain features and certain views of the drawings may be shown exaggerated in scale or in schematic in the interest of clarity and conciseness.

DETAILED DESCRIPTION

Any specific details of features or aspects are used for demonstration purposes only, and no unnecessary limitations or inferences are to be understood therefrom.

Before describing in detail exemplary aspects, it is noted that the aspects reside primarily in combinations of components and procedures related to the systems, methods, and media disclosed herein. Accordingly, the systems, methods, and media components and processes have been represented where appropriate by conventional symbols in the drawings, showing only those specific details that are pertinent to understanding the aspects of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship, or order between such entities or elements. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary aspects of the inventive concepts defined in the appended claims. Hence, specific steps, process order, dimensions, component connections, and other physical characteristics relating to the aspects disclosed herein are not to be considered as limiting, unless the claims expressly state otherwise. The use or mention of any single element contemplates a plurality of such element, and the use or mention of a plurality of any element contemplates a single element (for example, "a device" and "devices" and "a plurality of devices" and "one or more devices" and "at least one device" contemplate each other), regardless of whether particular variations are identified and/or described, unless impractical, impossible, or explicitly limited.

Mechanisms (which can include systems, methods, media, or any combination thereof), for navigating video content are disclosed herein. The mechanisms can, using a computer vision model and a language model, generate caption data for a plurality of video frames of at least one video content item. In some embodiments, the mechanisms can generate recognized speech data based at least on the audio data in the at least one video content item.

In some embodiments, the mechanisms can prompt user devices to provide user query data for navigating through the at least one video content item. In response to receiving the user query data, the mechanisms can, using a language model, generate a textual response to the user query data and cause one or more links to respective time positions in the at least one video content item to be presented for selection. In response to receiving a selection of a link to a time position, a time position, or a relevant video frame, the mechanisms can set the playback position to the selected time position. In some embodiments, in response to receiving the selection of the time position and in response to setting the playback position to the selected time position, the mechanisms can cause the at least one video content item to be presented beginning at the selected time position.

Figure 1:
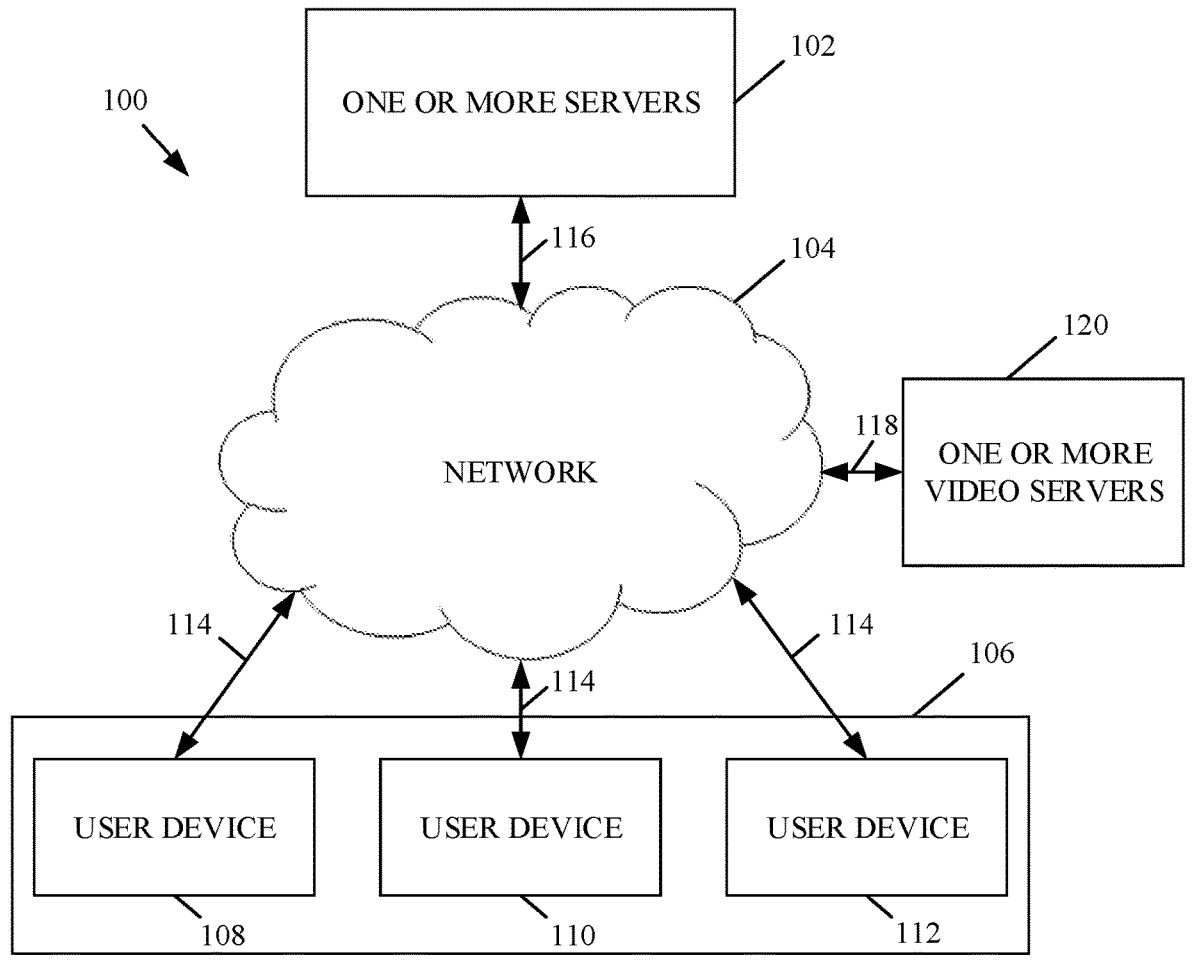
FIG. 1 illustrates a block diagram of a system for navigating video content, according to some embodiments disclosed herein.

Referring to FIG. 1, a system 100 for navigating video content can be used with some embodiments disclosed herein. In some embodiments, system 100 can comprise one or more servers 102, a network 104 (e.g., communication network), one or more user devices 106, one or more video servers 120, or any combination thereof. In some embodiments, the one or more user devices 106 can include a first user device 108, a second user device 110, a third user device 112, any other user device(s), or any combination thereof.

The one or more servers 102 can be any suitable server(s) for storing data, programs, or a combination thereof, for navigating video content. In some embodiments, the one or more servers 102 can include one or more computing devices. In some embodiments, the one or more servers 102 can store any suitable data about one or more video content items. For example, the data about the one or more video content items can include visual data of the one or more video content items. The visual data can include any video frames of the one or more video content items. As another example, the data about the one or more video content items can include audio data of the one or more video content items. As another example, the data about the one or more video content items can include any identified visual features in the one or more video content items, any generated caption data for any video frames of the one or more video content items, and any generated recognized speech data based at least on the audio data of the one or more video content items.

In some embodiments, the one or more servers 102 can be configured to at least prompt any of the one or more user devices 106 to provide query data, receive query data from any of the one or more user devices 106, generate textual responses to the query data from any of the one or more user devices 106, determine relevant video frames based on the generated textual responses, cause selectable links to respective time positions to be presented, send requests to the one or more video servers 120 for any portion(s) of any video content item, receive any portion(s) of any video content item from the one or more video servers 120, perform any other process disclosed herein, or any combination thereof.

The one or more video servers 120 can be any suitable server(s) for storing, managing, and/or delivering video content over a network such as network 104. For example, the one or more video servers 120 can store, manage, and/or deliver visual data of one or more video content items. The visual data can include any video frames of the one or more video content items. As another example, the one or more video servers 120 can store, manage, and/or deliver audio data of the one or more video content items. The one or more video servers 120 can store, manage, and/or deliver any other suitable data about the one or more video content items.

In some embodiments, the one or more video servers 120 can be configured to at least receive requests for playback of any video content item from the one or more servers 102 and/or any of the one or more user devices 106, and in response, send one or more portions of any of the video content items (e.g., by video streaming) to the one or more video servers 120 and/or any of the one or more user devices 106.

In some embodiments, the one or more user devices 106 can include one or more computing devices. The one or more computing devices can include a mobile device, such as a mobile phone, a tablet computer, a wearable computer, a laptop computer, a vehicle (e.g., a car, a boat, an airplane, or any other suitable vehicle), any other suitable mobile device, any suitable non-mobile device (e.g., a desktop computer, entertainment system, etc.), or any combination thereof. As another example, the one or more computing devices can include a media playback device, such as a television, a projector device, a game device or game console, any other suitable computing device, or any combination thereof.

The network 104 can include a wired network, a wireless network, or a combination thereof. In some embodiments, the network 104 can include the Internet, an intranet, a wide-area network (WAN), a local-area network (LAN), a digital subscriber line (DSL) network, a frame relay network, an asynchronous transfer mode (ATM) network, a virtual private network (VPN), any other suitable communication network, or any combination thereof. In some embodiments, one or more communications links 114 can connect the one or more user devices 106 to the network 104. In some embodiments, one or more communication links 116 can connect the network 104 to the one or more servers 102. In some embodiments, one or more communication links 118 can connect the network 104 to the one or more video servers 120. The one or more communication links 114, 116, 118 can be any communication links suitable for communicating information between the one or more user devices 106, the one or more servers 102, and the one or more video servers 120, such as, for example, network links, dial-up links, wireless links, hard-wired links, any other suitable communications links, or any combination thereof.

While the one or more servers 102 are illustrated as one device, any suitable number of computing devices can be included in the one or more servers 102 in some embodiments.

While the one or more video servers 120 are illustrated as one device, any suitable number of computing devices can be included in the one or more video servers 120 in some embodiments.

While three user devices 108, 110, 112 are illustrated in FIG. 1 to avoid over-complicating the figure, any suitable number of computing devices can be included in the one or more user devices 106 in some embodiments.

In some embodiments, the one or more servers 102, the one or more user devices 106, and the one or more video servers 120 can be implemented using any suitable hardware. For example, any device of the one or more servers 102, the one or more user devices 106, and the one or more video servers 120 can be implemented using any suitable general-purpose computer or special-purpose computer. Any general-purpose computer or special-purpose computer can include any suitable hardware.

Figure 2:
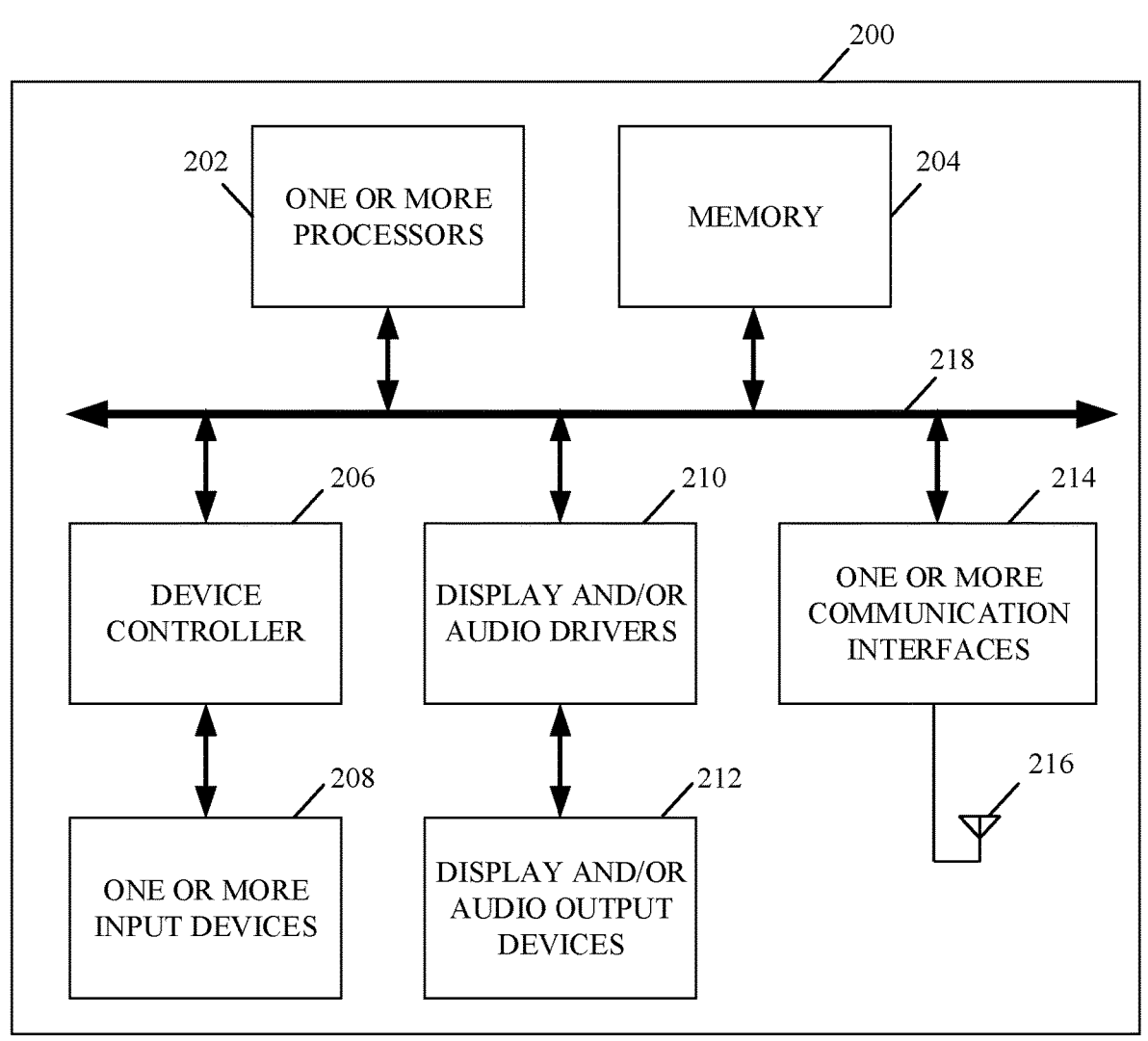
FIG. 2 illustrates a block diagram of a computing device for navigating video content, according to some embodiments disclosed herein.

Referring to FIG. 2, an example hardware of a computing device 200 is illustrated. In some embodiments, the computing device 200 can include one or more processors 202, memory 204, a device controller 206, one or more input devices 208, display and/or audio drivers 210, display and/or audio output devices 212, one or more communication interfaces 214, one or more antennas 216, a bus 218, or any combination thereof.

In some embodiments, the one or more processors 202 can include any suitable hardware processor, such as a central processing unit (CPU), a graphics processing unit (GPU), a tensor processing unit (TPU), an accelerated processing unit (APU), any other type of processing unit, or any combination thereof. In some embodiments, the one or more processors 202 can include a microprocessor, a microcontroller, a digital signal processor, dedicated logic, an application-specific integrated circuit (ASIC), a field programmable gate array (FPGA), an accelerator (e.g., an artificial intelligence (AI) accelerator or a cryptographic accelerator), any other suitable circuitry for controlling the functioning of a general purpose computer or a special purpose computer, or any combination thereof.

In some embodiments, one or more processors 202 of any server of the one or more servers 102 can be controlled by a server program stored in memory 204 of the server. For example, in some embodiments, the server program can cause the one or more processors 202 to prompt any of the one or more user devices 106 to provide query data, receive query data from any of the one or more user devices 106, generate textual responses to the query data from any of the one or more user devices 106, determine relevant video frames based on the generated textual responses, cause selectable links to respective time positions to be presented, send requests to the one or more video servers 120 for any portion(s) of any video content item, cause any portion(s) of any video content item from the one or more video servers 120 to be presented at the one or more user devices 106, perform any other process disclosed herein, or any combination thereof.

In some embodiments, one or more processors 202 of any user device (e.g., 108, 110, 112 in FIG. 1) of the one or more user devices 106 can be controlled by a computer program stored in memory 204 of the user device. For example, the computer program can cause the one or more processors 202 to send query data to the one or more servers 102, receive generated textual responses from the one or more servers 102, cause selectable links to respective time positions to be presented, send requests to the one or more video servers 120 for any portion(s) of any video content item, cause any portion(s) of any video content item from the one or more video servers 120 to be presented, perform any other process disclosed herein, or any combination thereof.

In some embodiments, the memory 204 can include any suitable memory, storage, or a combination thereof for storing programs, data, and/or any other suitable information. For example, memory 204 can include volatile memory, non-volatile memory, or any combination thereof. In some embodiments, memory 204 can include random access memory, read-only memory, flash memory, a hard disk drive, a solid state drive, optical media, any other suitable memory, or any combination thereof.

In some embodiments, the device controller 206 can include any suitable processor or circuitry for controlling and receiving any input from the one or more input devices 208. In some embodiments, the one or more input devices 208 can include a touchscreen, a keyboard, a mouse, one or more buttons, a voice recognition circuit, a camera, one or more sensors, a global positioning system (GPS) receiver, any other suitable input device, or any combination thereof. In some embodiments, the one or more sensors can include one or more accelerometers, one or more gyroscope sensors, one or more microphones, any other suitable sensors (e.g., an optical sensor, a temperature sensor, a near field sensor), or any combination thereof. In some embodiments, the one or more input devices 208 can be included in any device of the one or more servers 102, the one or more user devices 106, or any combination thereof.

In some embodiments, the display and/or audio drivers 210 can include any suitable circuitry for controlling and driving output to one or more display and/or audio output devices 212. For example, the output devices can include a display (e.g., including a touchscreen, a flat-panel display, a cathode ray tube display, a projector, any other suitable display or presentation device, or any combination thereof), one or more speakers, or a combination thereof.

In some embodiments, the one or more communication interfaces 214 can include any suitable circuitry for interfacing with one or more communication networks, such as network 104 as shown in FIG. 1. For example, the one or more communication interfaces 214 can include network interface card circuitry, wired communication circuitry, wireless communication circuitry, any other suitable communication network circuitry, or any combination thereof.

In some embodiments, the one or more antennas 216 can wirelessly communicate with a communication network (e.g., network 104). In some embodiments, the one or more antennas 216 can be omitted.

In some embodiments, the bus 218 can include any suitable communication system for communicating data, addresses, control signals, power, or any combination thereof, between two or more components 202, 204, 206, 210, and 214. In some embodiments, the bus 218 can include any suitable conductors that are constructed and arranged to communicate data, addresses, control signals, power, or any combination thereof, between two or more components 202, 204, 206, 210, and 214.

In some embodiments, any other suitable component(s) can be included in the computing device 200.

Figure 3:
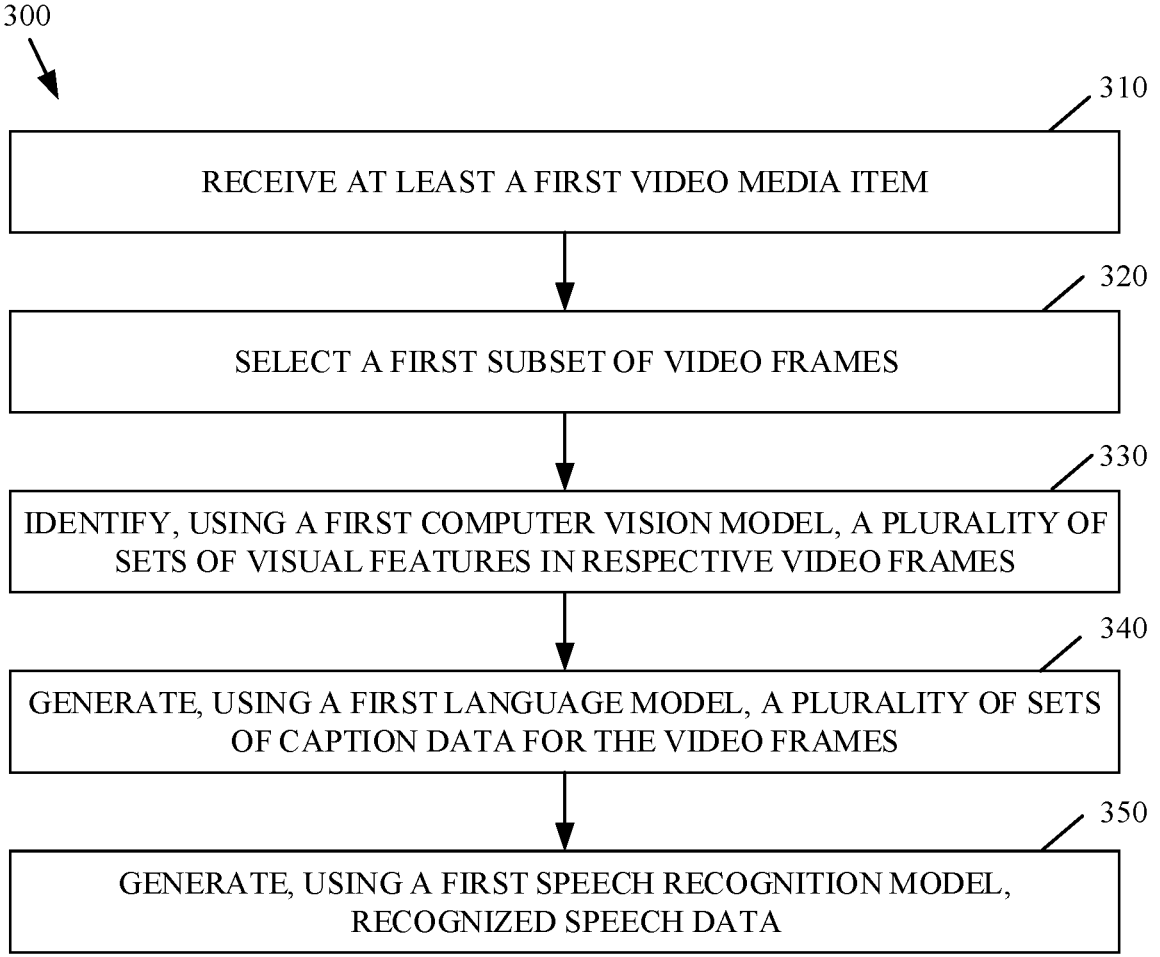
FIG. 3 illustrates a flow diagram of a process for generating video context and audio context of a video content item, according to some embodiments disclosed herein.

Referring to FIG. 3, a flow diagram of a process 300 for generating video context and audio context of a first video content item is shown, according to some embodiments of this disclosure. In some embodiments, the process 300 can be performed by any components in the system 100. For example, in some embodiments, any of the one or more servers 102 in FIG. 1, any of the one or more user devices 106 in FIG. 1, any of the one or more video servers 120 in FIG. 1, or any combination thereof, can be configured to perform the process 300.

In some embodiments, the process 300 can include receiving 310 at least a first video content item that includes visual data and audio data, the visual data including a first plurality of video frames associated with a first plurality of time positions in the first video content item. In some embodiments, the first video content item can be received by one or more servers (e.g., 102 in FIG. 1). The first video content item can be received in response to requesting the first video content item from one or more video servers (e.g., 120 in FIG. 1), or in response to requesting the first video content item from any of the one or more user devices (e.g., 106 in FIG. 1).

Figure 6:
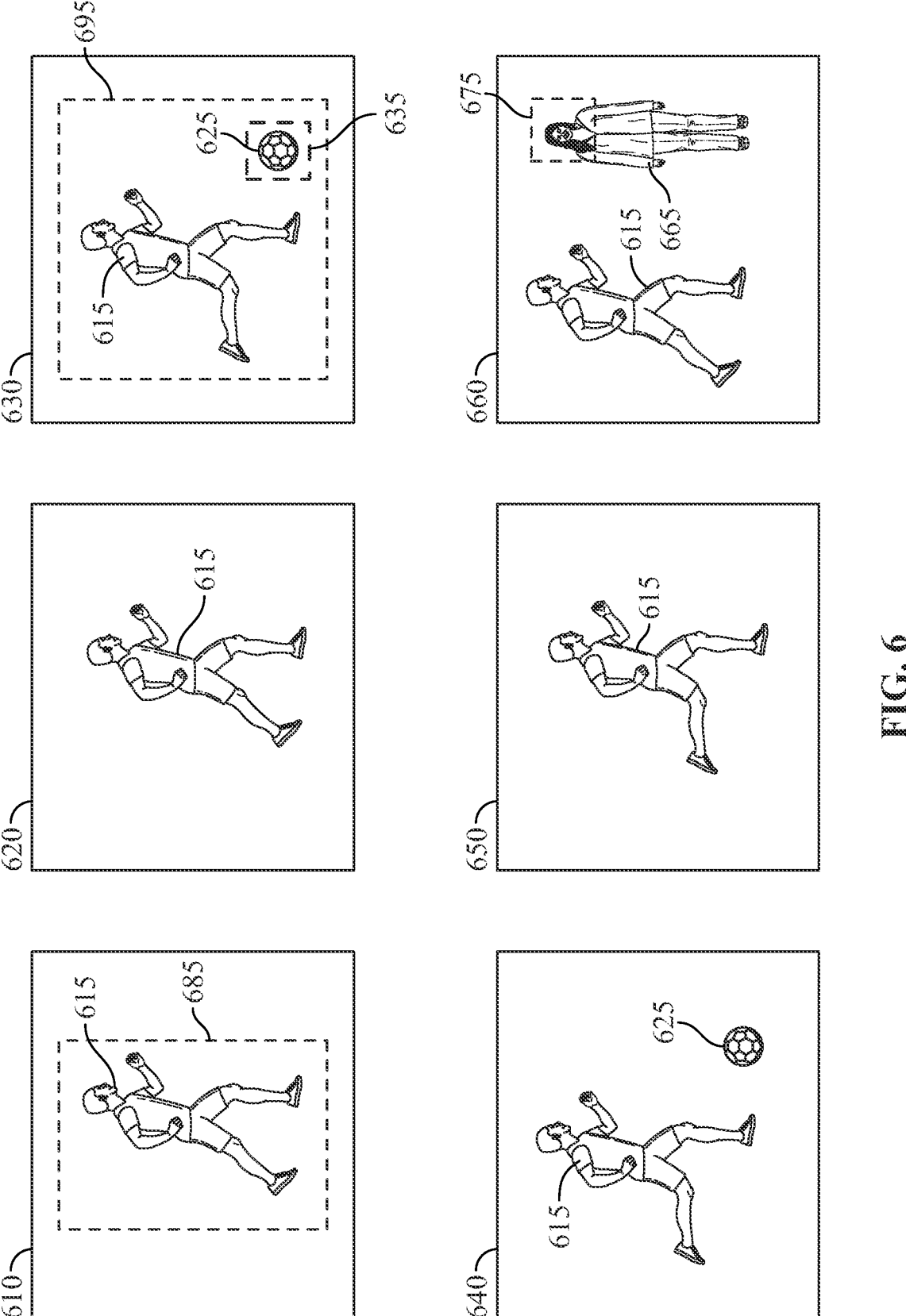
FIG. 6 illustrates video frames of a video content item analyzed by systems, methods, and media, according to some embodiments disclosed herein.

In some embodiments, the process 300 can include selecting 320 a first subset of video frames of the first plurality of video frames. In some embodiments, the process 300 can select video frames which are determined to be visually dissimilar to previously selected video frames. For example, FIG. 6 illustrates video frames 610, 620, 630, 640, 650, 660 of a sequence of video frames of a video content item that is available for selection by the process 300, according to some embodiments of this disclosure. While only six video frames are illustrated, the video content item can include any suitable number of video frames.

In some embodiments, the process 300 can include determining if a video frame, such as a first video frame 610, is the beginning video frame in the sequence of video frames of a video content item. If there is not at least one video frame positioned before the first video frame 610 in the sequence, the process 300 can determine that the first video frame 610 is the beginning video frame in the sequence, and select the first video frame 610 to be included in the first subset of video frames.

In some embodiments, the process 300 can compare sets of pixel values of consecutive video frames in the sequence of video frames of a video content item, and select any of the consecutive video frames based on the comparison. For example, if a difference between sets of pixel values of any pair of consecutive video frames meets a predetermined threshold, the process 300 can select one or both of the video frames in the pair of consecutive video frames to be included in the first subset of video frames. Such a difference can indicate that the pair of consecutive video frames depict something different in the video content item. If the difference does not meet the predetermined threshold, the process 300 can determine that the pair of consecutive video frames are not to be included in the first subset of video frames. Such a difference can indicate that the pair of consecutive video frames do not depict something different in the video content item, and are therefore redundant.

In some embodiments, the process 300 can compare sets of pixel values of a first pair of consecutive video frames 610, 620, compare sets of pixel values of a second pair of consecutive video frames 620, 630, compare sets of pixel values of a third pair of consecutive video frames 630, 640, compare sets of pixel values of a fourth pair of consecutive video frames 640, 650, compare sets of pixel values of a fifth pair of consecutive video frames 650, 660, and compare sets of pixel values of any other pair of consecutive video frames in the sequence, to determine if any of their differences meets a predetermined threshold.

As the first pair of consecutive video frames 610, 620 are visually similar, as both depict a man 615, a difference between their respective sets of pixel values may be relatively low, and therefore the process 300 may determine that the difference does not meet a predetermined threshold.

As the second pair of consecutive video frames 620, 630 are not visually similar, since the third video frame 630 additionally depicts a soccer ball 625, a difference between their respective sets of pixel values may be relatively high, and therefore the process 300 may determine that the difference meets the predetermined threshold.

As the third pair of consecutive video frames 630, 640 are visually similar, as both depict the man 615 and the soccer ball 625, a difference between their respective sets of pixel values may be relatively low, and therefore the process 300 may determine that the difference does not meet the predetermined threshold.

As the fourth pair of consecutive video frames 640, 650 are not visually similar, since the fifth video frame 650 does not depict the soccer ball 625, a difference between their respective sets of pixel values may be relatively high, and therefore the process 300 may determine that the difference meets the predetermined threshold.

As the fifth pair of consecutive video frames 650, 660 are not visually similar, since the sixth video frame 660 additionally depicts a woman 665, a difference between their respective sets of pixel values may be relatively high, and therefore the process 300 may determine that the difference meets the predetermined threshold.

Any suitable process can be performed to compare sets of pixel values to determine if their difference meets the predetermined threshold. For example, the process 300 can generate a histogram of a set of pixel values for each video frame, wherein each bin in the histogram corresponds to a range of pixel values and a count of pixels with intensities within the range of pixel values. Then, the process 300 can compare histograms of any pair of consecutive video frames to determine if the difference between their respective counts of pixels with intensities within any suitable range of pixel values meets a predetermined threshold. If the difference between the respective counts of pixels meets the predetermined threshold, the process 300 can select one or both of the video frames in the pair of consecutive video frames to be included in the first subset of video frames.

In some embodiments, the process 300 can convert video frames to grayscale before comparing sets of pixel values. In some embodiments, the process 300 can perform any suitable image processing on the video frames, such as blurring, before comparing sets of pixel values.

Turning back to FIG. 3, in some embodiments, the process 300 can include identifying 330, using a first computer vision model, a plurality of sets of visual features in respective video frames of the first subset of video frames. In some embodiments, the computer vision model can include any suitable computer vision model, such as, for example, an object detection or object recognition model, an image classifier, a landmark detection model, a text recognition model, an object tracking model, a gesture recognition model, a facial recognition model, an action recognition model, any other computer vision model(s), or any combination thereof. In some embodiments, the first computer vision model can be part of any suitable computer vision-language model. In some embodiments, the first computer vision model can include any suitable artificial neural networks. In some embodiments, the first computer vision model can be trained based at least on any images, video frames, any video content items, and any associated data provided by humans.

For example, in FIG. 6, the process 300 can perform object recognition on any video frame such as the first video frame 610 to determine that the first video frame 610 depicts any object such as a man 615 in a region 685 of the first video frame 610, and generate a suitable textual description such as "man" to be associated with the first video frame 610. As another example, the process 300 can perform object recognition on the third video frame 630 to determine that the third video frame 630 depicts another object such as a soccer ball 625 in a region 635 of the third video frame 630, and generate a suitable textual description such as "soccer ball" to be associated with the third video frame 630. As another example, the process 300 can perform action recognition on any video frame such as the third video frame 630 to determine that the third video frame 630 depicts an action such as a man 615 running in a region 695 of the third video frame 630, and generate a suitable textual description such as "man running" to be associated with the third video frame 630. As another example, the process 300 can perform facial recognition on any video frame such as the sixth video frame 660 to determine that the sixth video frame 660 depicts a particular person's face, the particular person named "Jane Smith". The process 300 can then generate a suitable textual description such as "Jane Smith" to be associated with the sixth video frame 660. The process 300 can generate any suitable textual description(s) based on any computer vision model used to analyze any video frame, and associate the textual description(s) with the video frame.

Turning back to FIG. 3, in some embodiments, the process 300 can include generating 340, using a first language model, a plurality of sets of caption data based at least on the plurality of sets of visual features in respective video frames of the first subset of video frames. In some embodiments, caption data generated for any video frame can include any textual description(s) associated with the video frame. In some embodiments, caption data generated for any video frame can include any textual description(s) generated in response to analyzing the video frame using any computer vision model. In some embodiments, the process 300 can associate any video frame with the caption data generated for the video frame. The caption data generated for any video frame can include any suitable textual description that indicates one or more visual features depicted in the video frame.

Turning back to FIG. 3, in some embodiments, the process 300 can include generating 340, using a first speech recognition model, recognized speech data based at least on the audio data of the first video content item. In some embodiments, generating 340, using the first speech recognition model, recognized speech data can include generating an audio transcription of the first video content item.

In some embodiments, the process 300 can associate recognized speech data portions with one or more time positions. For example, the process 300 can determine that audio data portions of the video content item are associated with respective time positions, and associate recognized speech data portions generated based on the respective audio data portions with the respective time positions. For example, if a recognized speech data portion generated based on an audio data portion includes textual data such as "hello," and if the audio portion is associated with a particular time position, the recognized speech data portion "hello" can be associated with the particular time position.

Referring to FIG. 4, a flow diagram of a process 400 for navigating video content is shown, according to some embodiments of this disclosure. In some embodiments, the process 400 can be performed by any components in the system 100 in FIG. 1. For example, in some embodiments, any of the one or more servers 102 in FIG. 1, any of the one or more user devices 106 in FIG. 1, any of the one or more video servers 120 in FIG. 1, or any combination thereof, can be configured to perform the process 400.

In some embodiments, the process 400 can include receiving 410 a selection of a first video content item. The selection of the first video content item can be received at one or more servers 102 in FIG. 1.

Figure 7:
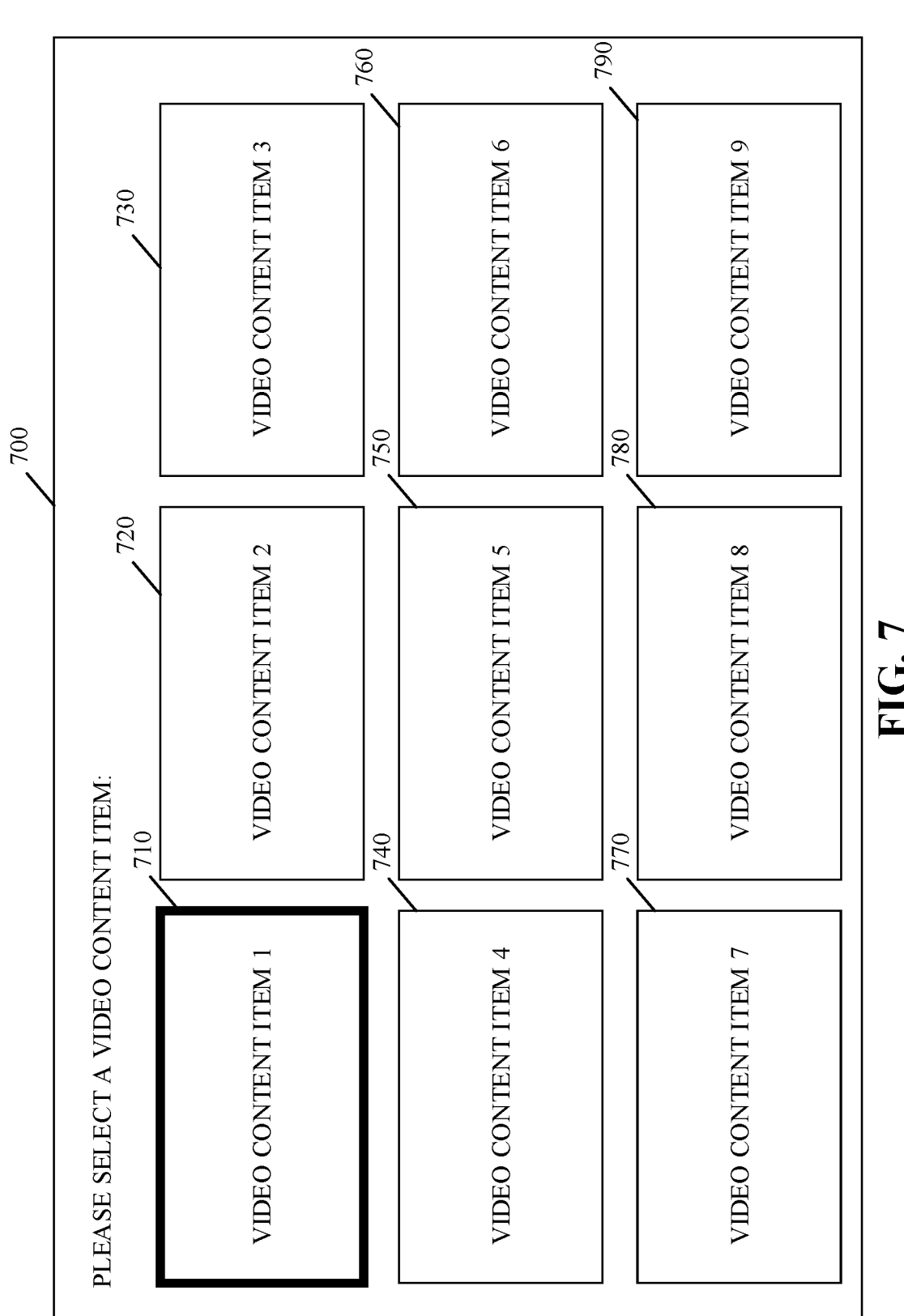
FIG. 7 illustrates video content items selectable by systems, methods, and media, according to some embodiments disclosed herein.

For example, referring to FIG. 7, the process 400 can cause a user interface such as user interface 700 to be presented. In some embodiments, the user interface 700 can be presented at any user device (e.g., any of the one or more user devices 106 in FIG. 1). In some embodiments, process 400 can cause video frames of video content items 710, 720, 730, 740, 750, 760, 770, 780, 790 to be presented for selection. In response, a user device can select any video content item such as video content item 710.

Figure 8:
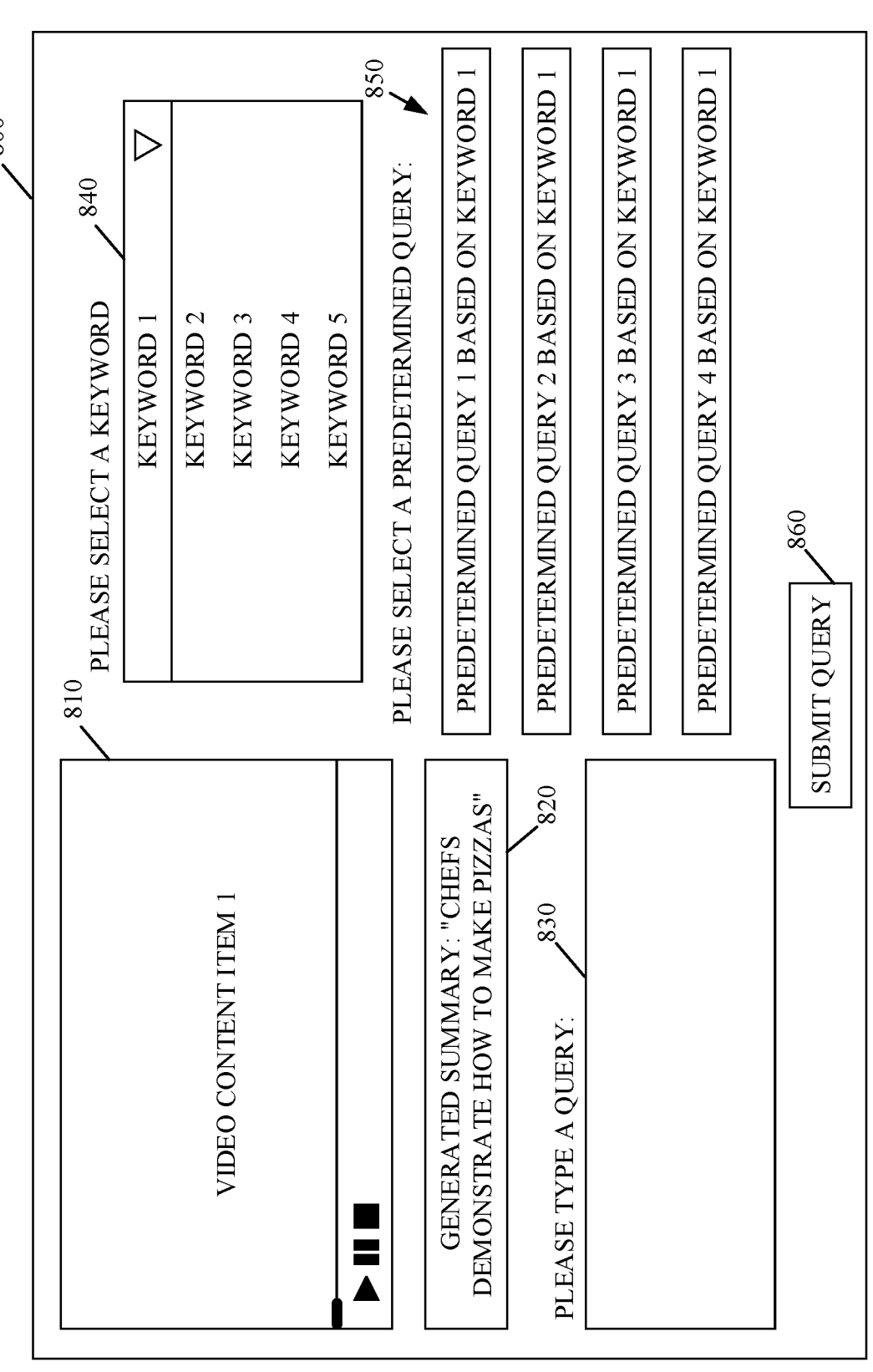
FIG. 8 illustrates a user interface for navigating video content, according to some embodiments disclosed herein.

Referring to FIG. 8, in response to receiving 410 a selection of the video content item 710, the process 400 can cause the video content item 710 to be presented. The video content item 710 can be presented within a video content player 810 in a user interface 800. In some embodiments, the user interface 800 can be presented at any user device.

In some embodiments, the process 400 can cause a generated summary 820 to be presented. The generated summary can be generated using any suitable language model based at least on the caption data generated for any video frames of the video content item 710, and any recognized speech data generated based on any audio data included in the video content item 710. As shown, the generated summary can include any suitable description about the video content item 710, such as, for example, "A chef demonstrates how to make pizzas."

Turning back to FIG. 4, in some embodiments, the process 400 can include prompting 420 a user device to provide user query data. For example, referring to FIG. 8, the process 400 can cause a prompt 830 to be presented. A user can enter any suitable text in the prompt 830, and select a submit icon 860 to send user query data that includes the entered text to one or more servers (e.g., 102 in FIG. 1). In response to submitting the user query data, the user device can send the user query data to the one or more servers.

Alternatively or additionally, in some embodiments, the process 400 can generate, using a language model, a plurality of keywords based at least on the caption data generated for any video frames of the video content item 710, and any recognized speech data generated based on any audio data included in the video content item 710. For example, the process 400 can cause the plurality of keywords to be presented for selection, for example, in a dropdown menu 840. In response to receiving a selection of a keyword, the process 400 can cause a plurality of predetermined user query suggestions 850 to be presented for selection, wherein each predetermined user query suggestion was determined, using a language model, based at least on the selected keyword. In some embodiments, in response to a user device selecting a predetermined query suggestion, the user device can send user query data that includes the selected predetermined query suggestion to one or more servers (e.g., 102 in FIG. 1).

Figure 9:
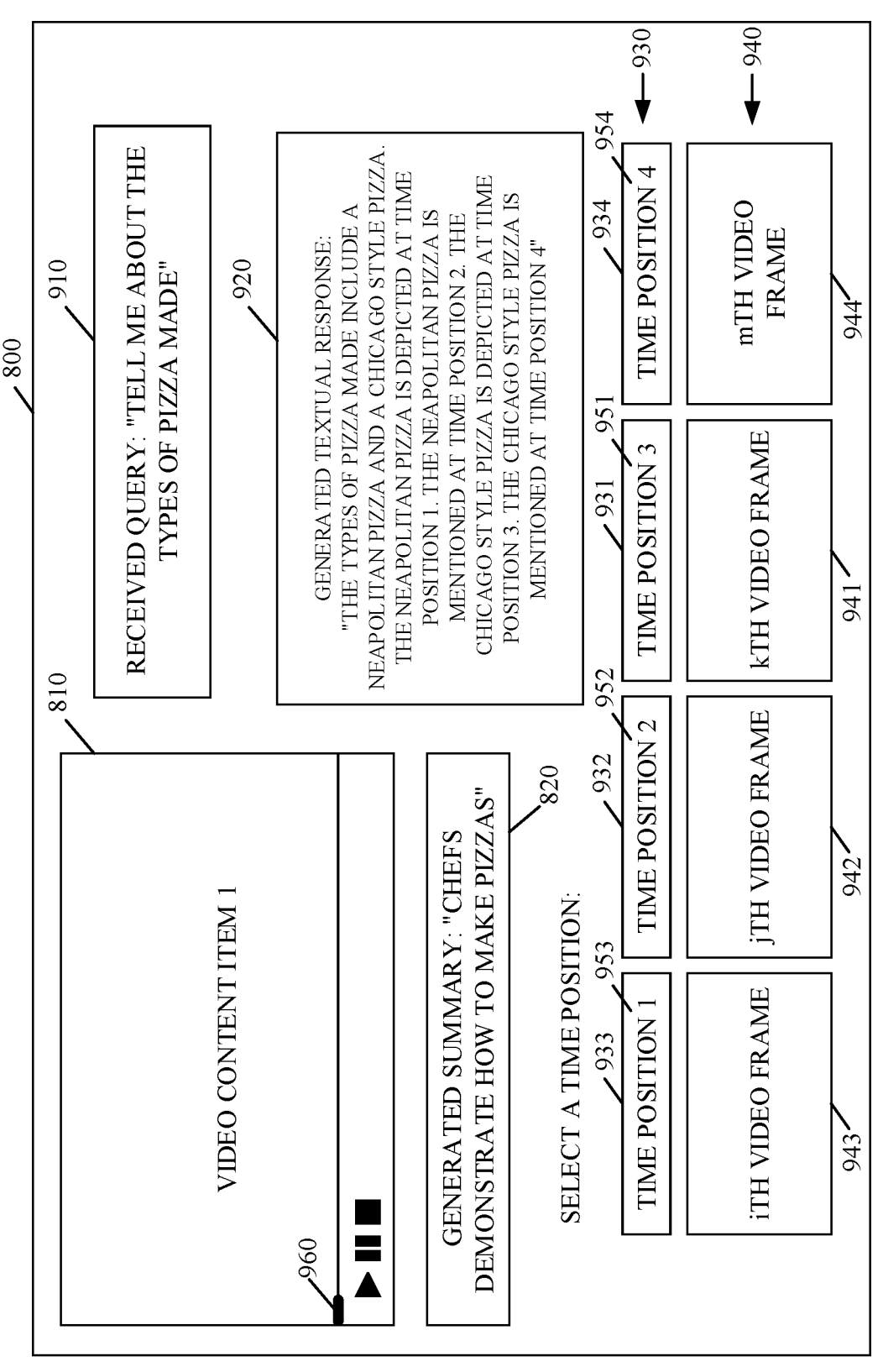
FIG. 9 illustrates a user interface for navigating video content, according to some embodiments disclosed herein.

Turning back to FIG. 4, in some embodiments, in response to any user device sending user query data to one or more servers, the process 400 can include receiving 430 first user query data from the user device. The user query data can include any suitable query data sent by a user device. Referring to FIG. 9, in response to receiving 430 the first user query data, the process 400 can cause the received user query data to be presented in a region 910 of the user interface 800. As shown, the received user query data can include any suitable user query data such as, for example, "tell me about the types of pizza made" sent by a user device.

Turning back to FIG. 4, in some embodiments, the process 400 can include generating 440, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item.

For example, referring to FIG. 9, the generated textual response can be presented in a region 920 of the user interface 800. As shown, the generated textual response can include any suitable generated textual response such as, for example, "The types of pizza made include a Neapolitan pizza and a margherita pizza. The Neapolitan pizza is depicted at time position 1. The Neapolitan pizza is mentioned at time position 2. The margherita pizza is depicted at time position 3. The margherita pizza is mentioned at time position 4."

Turning back to FIG. 4, in some embodiments, the process 400 can include determining 450, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item. In some embodiments, the first relevant video frames can be associated with respective time positions of a first subset of time positions of the first plurality of time positions.

For example, in FIG. 9, first relevant video frames 940 can include at least a first video frame 941, a second video frame 942, a third video frame 943, and a fourth video frame 944. As shown, the process 400 can cause the first relevant video frames 940 to be presented in, for example, the user interface 800. In some embodiments, the first relevant video frame 941 can be associated with a first time position 951 in the video content item 710, the second relevant video frame 942 can be associated with a second time position 952 in the video content item 710, the third relevant video frame 943 can be associated with a third time position 953 in the video content item 710, and the fourth relevant video frame 944 can be associated with a fourth time position 954 in the video content item 710.

Turning back to FIG. 4, in some embodiments, the process 400 can include causing 460 one or more selectable links to the respective time positions of the first subset of time positions to be presented.

For example, in FIG. 9, the process 400 can cause one or more selectable links 930 to be presented in the user interface 800. As shown, the one or more selectable links 930 can include a first selectable link 931, a second selectable link 932, a third selectable link 933, and a fourth selectable link 934. In some embodiments, the one or more selectable links 930 can be positioned proximate to, or can overlay, respective relevant video frames 940. In some embodiments, the one or more selectable links 930 can be positioned proximate to, or can overlay, respective time positions 951, 952, 953, 954. In some embodiments, a user can select any of the one or more selectable links 930, and in response, a user device can send the selection of any of the one or more selectable links 930 to one or more servers (e.g., 102 in FIG. 1). In some embodiments, the selectable links 930 can include any selectable icons, selectable buttons, hyperlinks, any other suitable links, or any combination thereof, that are configured to, when selected, send any suitable information indicating a selection of any of the one or more selectable links 930. In some embodiments, sending the selection of any of the one or more selectable links 930 can include sending any suitable information indicating a selection of any of the one or more selectable links 930.

Turning back to FIG. 4, in some embodiments, the process 400 can include receiving 470 a first selection of a first selectable link of the one or more selectable links, the first selectable link associated with a first time position of the first subset of time positions. In some embodiments, in response to receiving 470 the first selection of the first selectable link, the process 400 can include 480 causing first video content item to be presented beginning at the first time position in the first video content item.

Figure 10:
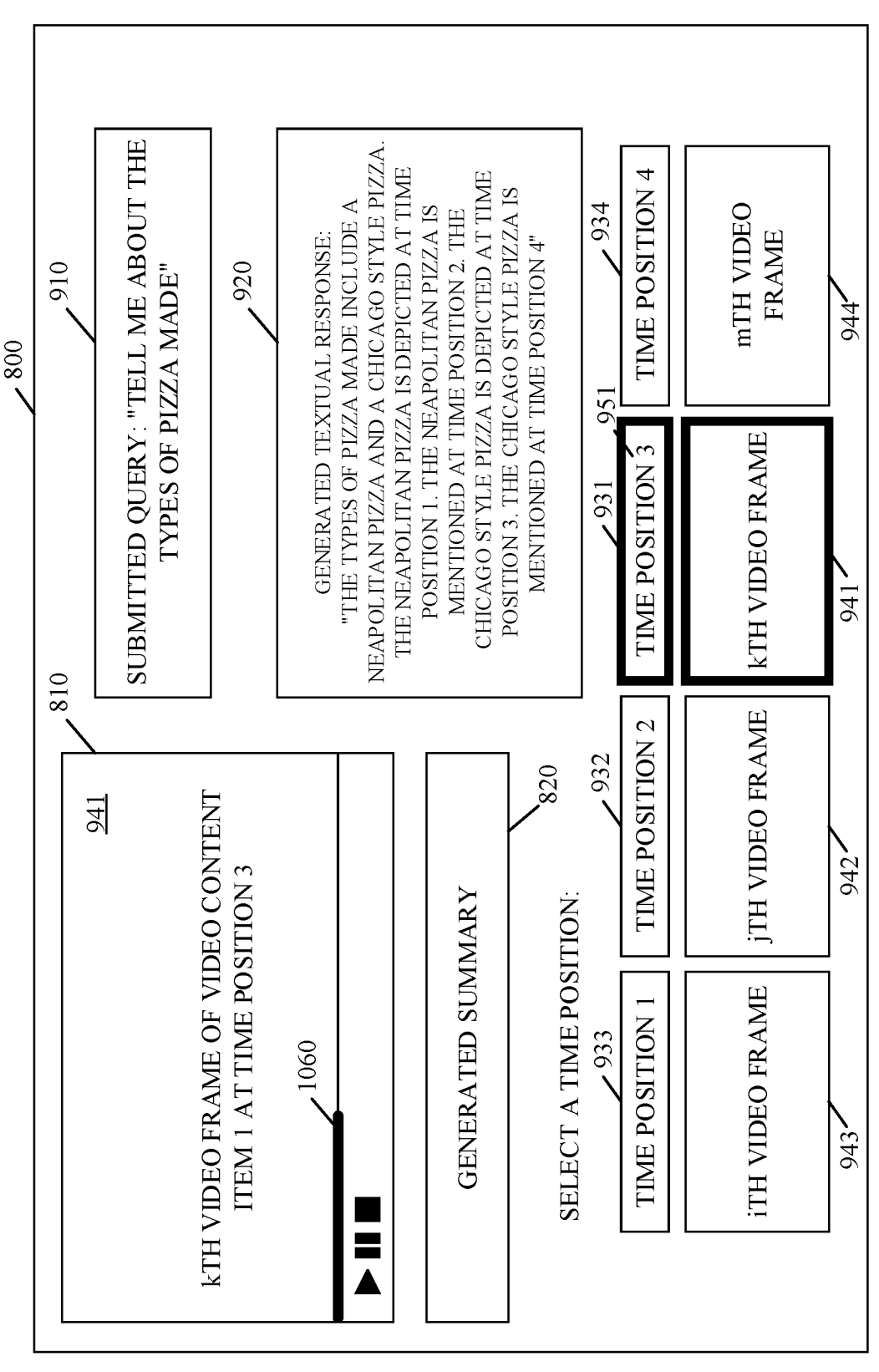
FIG. 10 illustrates a user interface for navigating video content, according to some embodiments disclosed herein.

For example, in FIG. 9, a first time position indicator 960 can indicate that a playback position is at an initial time position. Referring to FIG. 10, in response to receiving a selection of the first selectable link 931 to the first time position 951, indicated for example by the bold border of the first selectable link 931 and the bold border of the first relevant video frame 941, the process 400 can set the playback position of the first video content item 710 to the first time position 951 associated with the first relevant video frame 941. In response, the process 400 can cause the first video content item 710 to be presented beginning with the first relevant video frame 941. In some embodiments, the process 400 can cause the first video content item 710 to be presented beginning at the first time position 951 in the first video content item 710, as indicated for example by the second time position indicator 1060 which has changed relative to the first time position indicator 960. In some embodiments, the first relevant video frame 941 can include depictions of any recognized object, recognized face, recognized text, or any combination thereof, determined to be relevant to the user query data.

In some embodiments, the first language model, the second language model, the third language model, or any combination thereof, can include one or more large language models, artificial neural networks, or any other language models configured to generate output text based at least on input text and any suitable training data. In some embodiments, the first language model, the second language model, the third language model, or any combination thereof, can be trained using supervised learning, reinforcement learning, or any combination thereof, and any suitable human feedback data. In some embodiments, the first language model, the second language model, the third language model, or any combination thereof, can be a part of a computer vision-language model.

Turning back to FIG. 4, the process 400 can proceed to loop back to receiving 410 a selection of any other video content item.

Referring to FIG. 5, a flow diagram of a process 500 for navigating video content is shown, according to some embodiments disclosed herein. In response to receiving 410 a selection of any other video content item, the process 500 can include receiving 510 second user query data that is different from the first user query data received in process 400. For example, as shown in FIG. 11, a region 1110 of the user interface 800 can include the second user query data "what chefs are in the video?"

Turning back to FIG. 5, in some embodiments, the process 500 can include determining 520 one or more keywords in the second user query data. For example, the one or more keywords can be determined to include "chefs" and "video."

In some embodiments, the process 500 can include generating 530, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item. In some embodiments, the second textual response can be different than the first textual response. In some embodiments, the second textual response includes the one or more keywords in the second user query data.

For example, in FIG. 11, a region 1120 of the user interface 800 can include the second textual response "the chefs in the video are Jane Doe and John Doe. Jane Doe is depicted at time position 5. John Doe is depicted at time position 6."

Turning back to FIG. 5, in some embodiments, the process 500 can include determining 540, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions. In some embodiments, at least one time position in the second subset of time positions is not included in the first subset of time positions.

For example, in FIG. 11, the process 500 can cause the second relevant video frames 1141 and 1142 to be presented, and second subset of time positions 1151 and 1152 to be presented which are different from the first subset of time positions 951, 952, 953, 954 presented in FIG. 9.

Turning back to FIG. 5, in some embodiments, the process 500 can include causing 550 one or more selectable links to the respective time positions of the second subset of time positions to be presented.

For example, in FIG. 11, the process 500 can cause selectable links 1130 to be presented, wherein the selectable links 1130 include a fifth selectable link 1132 to a fifth time position 1152, and a sixth selectable link 1131 to a sixth time position 1151.

Turning back to FIG. 5, in some embodiments, the process 500 can include receiving 560 a second selection of a second time position of the second subset of time positions. In some embodiments, the process 500 can include 570 causing the first video content item to be presented beginning at the second time position in the first video content item.

For example, in FIG. 11, the process 500 can cause the first video content item 710 to be presented beginning at the sixth time position 1151. The process 500 can cause the first video content item 710 to be presented beginning at the sixth video frame 1142. A third time position indicator 1160 has changed relative to the second time position indicator 1060 indicating that the process 500 has navigated to a different time position in the video content item 710.

The following description of variants is only illustrative of components, elements, acts, systems, media, and methods considered to be within the scope of the invention and are not in any way intended to limit such scope by what is specifically disclosed or not expressly set forth. The components, elements, acts, systems, media, and methods as described herein may be combined and rearranged other than as expressly described herein and are still considered to be within the scope of the invention.

According to variation 1, a method for navigating video content can include receiving at least a first video content item that includes visual data and audio data, the visual data including a first plurality of video frames associated with a first plurality of time positions in the first video content item; selecting a first subset of video frames of the first plurality of video frames; identifying, using a first computer vision model, a plurality of sets of visual features in respective video frames of the first subset of video frames; generating, using a first language model, a plurality of sets of caption data based at least on the plurality of sets of visual features in respective video frames of the first subset of video frames; generating, using a first speech recognition model, recognized speech data based at least on the audio data of the first video content item; receiving first user query data; generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

Variation 2 can include the method of variation 1, further comprising: receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

Variation 3 can include the method of variation 1, wherein identifying, using the first computer vision model, the plurality of sets of visual features includes identifying, using object recognition, the plurality of sets of visual features in respective video frames of the first subset of video frames.

Variation 4 can include the method of variation 1, wherein identifying, using the first computer vision model, the plurality of sets of visual features includes identifying, using action recognition, the plurality of sets of visual features in respective video frames of the first subset of video frames.

Variation 5 can include the method of variation 1, wherein identifying, using the first computer vision model, the plurality of sets of visual features includes identifying, using facial recognition, a plurality of facial features in respective video frames of the first subset of video frames.

Variation 6 can include the method of variation 1, further comprising: receiving second user query data that is different from the first user query data; determining one or more keywords in the second user query data; and generating, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item; wherein: the second textual response includes the one or more keywords in the second user query data; and the second textual response is different than the first textual response.

Variation 7 can include the method of variation 6, further comprising: determining, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

According to variation 8, a system for navigating video content can include memory; and one or more processors coupled to the memory and configured at least to: receive at least a first video content item that includes visual data and audio data, the visual data including a first plurality of video frames associated with a first plurality of time positions in the first video content item; select a first subset of video frames of the first plurality of video frames; identify, using a first computer vision model, a plurality of sets of visual features in respective video frames of the first subset of video frames; generate, using a first language model, a plurality of sets of caption data based at least on the plurality of sets of visual features in respective video frames of the first subset of video frames; generate, using a first speech recognition model, recognized speech data based at least on the audio data of the first video content item; receive first user query data; generate, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determine, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and cause one or more selectable links to the respective time positions of the first subset of time positions to be presented.

Variation 9 can include the system of variation 8, wherein the one or more processors are further configured to: receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

Variation 10 can include the system of variation 8, wherein identifying, using the first computer vision model, the plurality of sets of visual features includes identifying, using object recognition, the plurality of sets of visual features in respective video frames of the first subset of video frames.

Variation 11 can include the system of variation 8, wherein identifying, using the first computer vision model, the plurality of sets of visual features includes identifying, using action recognition, the plurality of sets of visual features in respective video frames of the first subset of video frames.

Variation 12 can include the system of variation 8, wherein identifying, using the first computer vision model, the plurality of sets of visual features includes identifying, using facial recognition, a plurality of facial features in respective video frames of the first subset of video frames.

Variation 13 can include the system of variation 8, wherein the one or more processors are further configured to: receive second user query data that is different from the first user query data; determine one or more keywords in the second user query data; and generate, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item; wherein: the second textual response includes the one or more keywords in the second user query data; and the second textual response is different than the first textual response.

Variation 14 can include the system of variation 13, wherein the one or more processors are further configured to: determine, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

According to variation 15, a non-transitory computer-readable medium can include instructions, that when executed by one or more processors, cause the one or more processors to perform a method for navigating video content, the method comprising: receiving at least a first video content item that includes visual data and audio data, the visual data including a first plurality of video frames associated with a first plurality of time positions in the first video content item; selecting a first subset of video frames of the first plurality of video frames; identifying, using a first computer vision model, a plurality of sets of visual features in respective video frames of the first subset of video frames; generating, using a first language model, a plurality of sets of caption data based at least on the plurality of sets of visual features in respective video frames of the first subset of video frames; generating, using a first speech recognition model, recognized speech data based at least on the audio data of the first video content item; receiving first user query data; generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item; determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

Variation 16 can include the non-transitory computer-readable medium of variation 15, wherein the method further comprises: receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

Variation 17 can include the non-transitory computer-readable medium of variation 15, wherein identifying, using the first computer vision model, the plurality of sets of visual features includes identifying, using object recognition, the plurality of sets of visual features in respective video frames of the first subset of video frames.

Variation 18 can include the non-transitory computer-readable medium of variation 15, wherein identifying, using the first computer vision model, the plurality of sets of visual features includes identifying, using facial recognition, a plurality of facial features in respective video frames of the first subset of video frames.

Variation 19 can include the non-transitory computer-readable medium of variation 15, wherein the method further comprises: receiving second user query data that is different from the first user query data; determining one or more keywords in the second user query data; and generating, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item; wherein: the second textual response includes the one or more keywords in the second user query data; and the second textual response is different than the first textual response.

Variation 20 can include the non-transitory computer-readable medium of variation 19, wherein the method further comprises: determining, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

It will be understood that it would be unduly repetitious and obfuscating to describe and illustrate every reordering, combination and subcombination of the elements and the aspects described. Accordingly, all elements, processes, and subprocesses can be combined in any way and/or combination, and the present specification, including the drawings, shall be construed to constitute a complete written description of all reorderings, combinations and subcombinations of the elements, processes, and subprocesses and of the aspects described herein, and of the manner and process of making and using the elements, and shall support claims to any such combination or subcombination. Any processes and subprocesses disclosed herein can be performed in any suitable order.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for navigating video content, comprising:

receiving at least a first video content item that includes visual data and audio data, the visual data including a first plurality of video frames associated with a first plurality of time positions in the first video content item;

selecting a first subset of video frames of the first plurality of video frames;

identifying, using a first computer vision model, a plurality of sets of visual features in respective video frames of the first subset of video frames;

generating, using a first language model, a plurality of sets of caption data based at least on the plurality of sets of visual features in respective video frames of the first subset of video frames;

generating, using a first speech recognition model, recognized speech data based at least on the audio data of the first video content item;

receiving first user query data;

generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item;

determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

2. The method of claim 1, further comprising:

receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

3. The method of claim 1, wherein identifying, using the first computer vision model, the plurality of sets of visual features includes identifying, using object recognition, the plurality of sets of visual features in respective video frames of the first subset of video frames.

4. The method of claim 1, wherein identifying, using the first computer vision model, the plurality of sets of visual features includes identifying, using action recognition, the plurality of sets of visual features in respective video frames of the first subset of video frames.

5. The method of claim 1, wherein identifying, using the first computer vision model, the plurality of sets of visual features includes identifying, using facial recognition, a plurality of facial features in respective video frames of the first subset of video frames.

6. The method of claim 1, further comprising:

receiving second user query data that is different from the first user query data;

determining one or more keywords in the second user query data; and generating, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item;

wherein:

the second textual response includes the one or more keywords in the second user query data; and the second textual response is different than the first textual response.

7. The method of claim 6, further comprising:

determining, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

8. A system for navigating video content, comprising:

memory; and one or more processors coupled to the memory and configured at least to:

receive at least a first video content item that includes visual data and audio data, the visual data including a first plurality of video frames associated with a first plurality of time positions in the first video content item;

select a first subset of video frames of the first plurality of video frames;

identify, using a first computer vision model, a plurality of sets of visual features in respective video frames of the first subset of video frames;

generate, using a first language model, a plurality of sets of caption data based at least on the plurality of sets of visual features in respective video frames of the first subset of video frames;

generate, using a first speech recognition model, recognized speech data based at least on the audio data of the first video content item;

receive first user query data;

generate, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item;

determine, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and cause one or more selectable links to the respective time positions of the first subset of time positions to be presented.

9. The system of claim 8, wherein the one or more processors are further configured to:

receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

10. The system of claim 8, wherein identifying, using the first computer vision model, the plurality of sets of visual features includes identifying, using object recognition, the plurality of sets of visual features in respective video frames of the first subset of video frames.

11. The system of claim 8, wherein identifying, using the first computer vision model, the plurality of sets of visual features includes identifying, using action recognition, the plurality of sets of visual features in respective video frames of the first subset of video frames.

12. The system of claim 8, wherein identifying, using the first computer vision model, the plurality of sets of visual features includes identifying, using facial recognition, a plurality of facial features in respective video frames of the first subset of video frames.

13. The system of claim 8, wherein the one or more processors are further configured to:

receive second user query data that is different from the first user query data;

determine one or more keywords in the second user query data; and generate, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item;

wherein:

the second textual response includes the one or more keywords in the second user query data; and the second textual response is different than the first textual response.

14. The system of claim 13, wherein the one or more processors are further configured to:

determine, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

15. A non-transitory computer-readable medium comprising instructions, that when executed by one or more processors, cause the one or more processors to perform a method for navigating video content, the method comprising:

receiving at least a first video content item that includes visual data and audio data, the visual data including a first plurality of video frames associated with a first plurality of time positions in the first video content item;

selecting a first subset of video frames of the first plurality of video frames;

identifying, using a first computer vision model, a plurality of sets of visual features in respective video frames of the first subset of video frames;

generating, using a first language model, a plurality of sets of caption data based at least on the plurality of sets of visual features in respective video frames of the first subset of video frames;

generating, using a first speech recognition model, recognized speech data based at least on the audio data of the first video content item;

receiving first user query data;

generating, using a second language model, at least a first textual response to the first user query data based at least on the first user query data, the plurality of sets of caption data generated using the first language model based at least on the plurality of sets of visual features in respective video frames of the first subset of video frames, and the recognized speech data generated using the first speech recognition model based at least on the audio data of the first video content item;

determining, using a third language model, first relevant video frames of the first subset of video frames based at least on the first textual response to the first user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the first relevant video frames are associated with respective time positions of a first subset of time positions of the first plurality of time positions; and causing one or more selectable links to the respective time positions of the first subset of time positions to be presented.

16. The non-transitory computer-readable medium of claim 15, wherein the method further comprises:

receiving a first selection of a first selectable link of the one or more selectable links, the first selectable link associated with a first time position of the first subset of time positions; and in response to receiving the first selection of the first selectable link, causing the first video content item to be presented beginning at the first time position in the first video content item.

17. The non-transitory computer-readable medium of claim 15, wherein identifying, using the first computer vision model, the plurality of sets of visual features includes identifying, using object recognition, the plurality of sets of visual features in respective video frames of the first subset of video frames.

18. The non-transitory computer-readable medium of claim 15, wherein identifying, using the first computer vision model, the plurality of sets of visual features includes identifying, using facial recognition, a plurality of facial features in respective video frames of the first subset of video frames.

19. The non-transitory computer-readable medium of claim 15, wherein the method further comprises:

receiving second user query data that is different from the first user query data;

determining one or more keywords in the second user query data; and generating, using the second language model, at least a second textual response to the second user query data based at least on the second user query data, the plurality of sets of caption data generated using the first language model based at least on the plurality of sets of visual features in respective video frames of the first subset of video frames, and the recognized speech data generated using the first speech recognition model based at least on the audio data of the first video content item;

wherein:

the second textual response includes the one or more keywords in the second user query data; and the second textual response is different than the first textual response.

20. The non-transitory computer-readable medium of claim 19, wherein the method further comprises:

determining, using the third language model, second relevant video frames of the first subset of video frames based at least on the second textual response to the second user query data generated using the second language model, the plurality of sets of caption data generated using the first language model based at least on the plurality of sets of visual features in respective video frames of the first subset of video frames, and the recognized speech data generated using the first speech recognition model based at least on the audio data of the first video content item, wherein the second relevant video frames are associated with respective time positions of a second subset of time positions of the first plurality of time positions, and wherein at least one time position in the second subset of time positions is not included in the first subset of time positions.

* * * * *